United States Patent [19]
Cunningham et al.

[11] Patent Number: 4,580,840
[45] Date of Patent: Apr. 8, 1986

[54] SEAT COMPRISING A FABRIC TENSIONED OVER SPACED RIGID MEMBERS

[75] Inventors: Douglas J. Cunningham, Lutterworth; Harry W. Gilkes, Coventry; Keith J. Bishop, Birmingham; Paul W. Turner, Castle Bromwich, all of England

[73] Assignee: Britax (Dynasafe) Limited, Bolton, England

[21] Appl. No.: 534,188

[22] Filed: Sep. 21, 1983

[30] Foreign Application Priority Data

Sep. 23, 1982 [GB] United Kingdom ............... 8227210
May 13, 1983 [GB] United Kingdom ............... 8313303

[51] Int. Cl.⁴ .................... A47C 31/00; A47C 7/02
[52] U.S. Cl. .................... 297/452; 5/475; 297/219
[58] Field of Search ............ 297/218, 219, 452; 5/246, 247, 248, 470, 471, 475, 476

[56] References Cited

U.S. PATENT DOCUMENTS

| | | | |
|---|---|---|---|
| 1,220,644 | 3/1917 | Kohler | 297/452 |
| 1,885,109 | 11/1932 | Burkart | 297/219 X |
| 2,407,933 | 9/1946 | Neely | 5/247 |
| 2,612,941 | 10/1952 | Naughton, Jr. | 155/180 |
| 3,058,778 | 10/1962 | Campbell | 297/452 |
| 3,586,376 | 6/1971 | Le Mire | 297/452 |

FOREIGN PATENT DOCUMENTS

| | | | |
|---|---|---|---|
| 496756 | 4/1930 | Fed. Rep. of Germany | 5/475 |
| 1130717 | 5/1962 | Fed. Rep. of Germany | |
| 548376 | 10/1922 | France | |
| 1281846 | 7/1972 | United Kingdom | 5/475 |

*Primary Examiner*—William E. Lyddane
*Assistant Examiner*—Peter R. Brown
*Attorney, Agent, or Firm*—Hayes, Davis & Soloway

[57] ABSTRACT

The seat portion of a vehicle seat comprises upper and lower rigid frames which are held spaced from each other by compression springs. The upper frame is rigidly mounted on supports. A fabric cover (not shown) encloses the two frames and is put under tension by the springs.

2 Claims, 3 Drawing Figures

SEAT COMPRISING A FABRIC TENSIONED OVER SPACED RIGID MEMBERS

This invention relates to seats and seat components. The invention has particular, but not exclusive, application to seats for vehicles.

According to the invention, a seat component comprises a rigid frame, a pair of mutually spaced rigid tensioning members spaced from a corresponding pair of mutually opposite side members of the frame on the opposite side thereof to the body of an occupant of a seat incorporating the seat component, support means rigidly connected to the frame, a fabric cover extending from the tensioning members so as to cover the frame and resilient means for urging the tensioning members away from the frame so as to put the fabric cover under tension.

The fabric cover may have its edges clipped or otherwise secured to the tensioning members. However, in a preferred form of the invention, the fabric cover takes the form of a sleeve enclosing both the frame and the tensioning members but not actually fastened to either. In a further development, the sleeve may take the form of a bag closed at one end with the other end having an arrangement of lacing or other closure means whereby it may be closed after the frame and the tensioning members have been inserted.

Preferably the tensioning members comprise opposite side members of a second frame.

A seat may have either or both of its seat portion and back rest formed from seat components in accordance with the invention. When the invention is applied to a vehicle seat, the support means for the first frame of the seat portion comprises conventional seat slides and may also incorporate a height adjustment mechanism. The support means for the first frame of the back portion may include a recline mechanism mounted on the first frame of the seat portion.

The fabric may be arranged to be drawn into contact with the first frame on both sides of each of two mutually opposite members of the second frame so as to provide a recessed area bounded by the second frame which facilitates access to the first frame for connecting the support means thereto.

Embodiments of the invention will now be described, by way of example, with reference to the accompanying drawings, in which.

Figure 1:
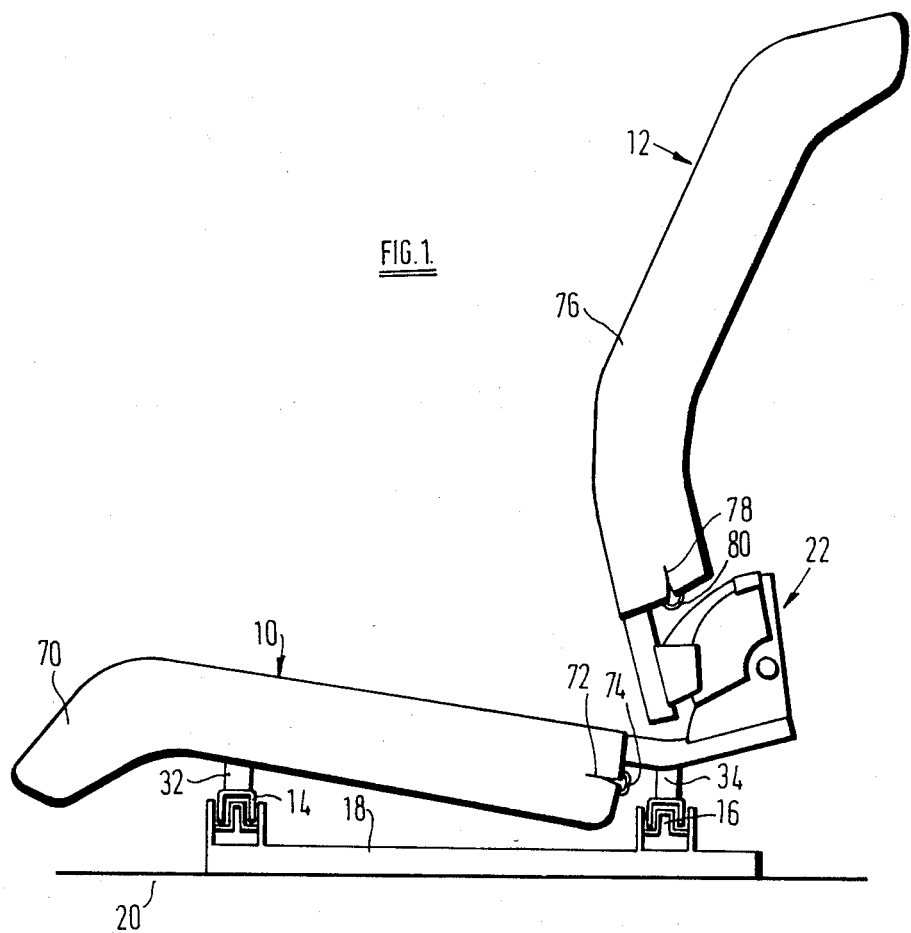
FIG. 1 is a side view of a vehicle seat in accordance with the invention.
Figure 2:
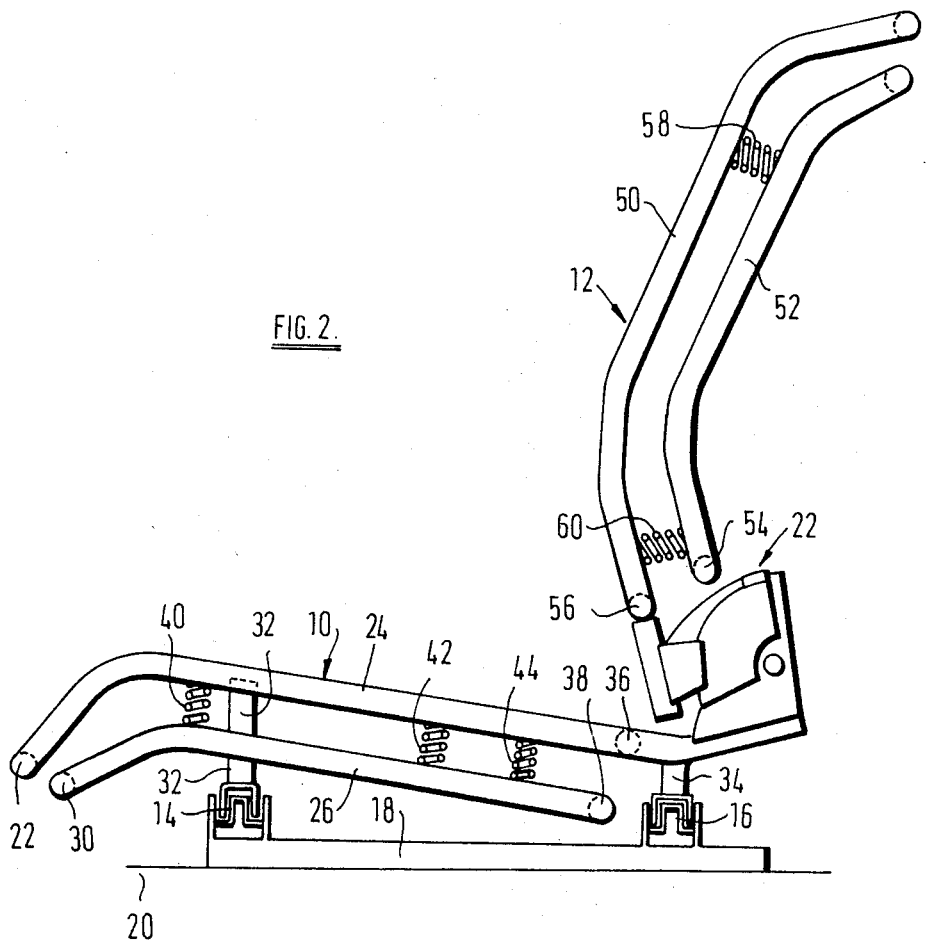
FIG. 2 is a side view of the seat shown in FIG. 1 with the fabric covers removed.

The seat shown in FIGS. 1 and 2 comprises a seat portion 10 and a back portion 12. The seat portion 10 is supported, by means of height adjustment mechanisms 14 and 16, on seat slides 18 which are secured to the vehicle floor 20. The height adjustment mechanisms may be as described in our U.S. patent application No. 523,730. The back rest 12 is mounted on the seat portion 10 by means of a seat-back recline mechanism, of conventional design, for example as described in Patent Specification No. GB-A-1027913, and indicated generally at 22.

Referring now specifically to FIG. 2, the frame of the seat portion 10 comprises first and second U-shaped tubular frame members 24 and 26, each of which have their side limbs extending along the sides of the seat and their coupling portions 28, 30 extending across the front thereof. Both these frame members are formed of tubular material. The first frame member 24 is supported, near its front on two support legs 32 (one connected to each of the side limbs of the U-shape) which project between, but are not connected to, the height adjustment mechanism 14. A second pair of support members 34 supports the rear end of the first frame member 24 on the height adjustment mechanism 16. A transverse tubular member 36 interconnects the side limbs of the frame member 24 just in front of the rear support members 34.

The second frame member 26 has the rear ends of its side limbs interconnected by a tubular member 38 and is supported below the first frame member 24 by three pairs of compression springs 40, 42 and 44, the springs of each pair extending between corresponding side limbs of the two frames. The rearmost two pairs of compression springs 42 and 44 are disposed relatively close to one another because the greater proportion of the weight of a seat occupant is imposed near the rear of the seat portion 10.

The seat back portion 12 is similarly constructed from the U-shaped tubular frame members 50 and 52, the first frame member 50 having the ends of its side limbs coupled by the seat back recline mechanism 22 to the rear ends of the side limbs of the first frame member 24 of the seat portion 10. The bottom ends of the side limbs of the second frame member 52 are connected to one another by a transverse tubular member 54 while a similar tubular member 56 extends beween the side limbs of the first frame member 50 just above the recline mechanism 22. The two frame members 50 and 52 of the back portion 12 are biased apart from one another by pairs of compression springs 58 and 60, the springs of each pair extending between corresponding side limbs of the two U-shaped frame members 50 and 52.

Turning back to FIG. 1, the frame of the seat portion 10 is covered by a fabric bag 70 which is closed along its front and side edges and has an opening 72 along its rear edge which is closed by lacing 74. Similarly the frame of the seat back 12 is covered by a fabric bag 76 which is closed along its top and side edges and has an opening 78 along its rear edge which is closed by lacing 80.

To facilitate assembly, each of the front support members 32 is formed in two parts with the joint (not shown) between the two parts approximately level with the second frame member 26. A respective slot (not shown) is provided in the cover 70 in alignment with each of the support legs 32. The cover 70 is fitted with the bottom parts removed. The bottom parts of the legs 32 are then coupled to the top parts, the cover being flexed sufficiently to enable the two parts of each support leg to be bolted or otherwise joined together. It is preferable for this joint to be formed in a releasable manner to facilitate replacement of the cover 10 in the event that it is damaged.

In use, the various compression springs 40, 42, 44, 58 and 60 maintain tension in the fabric covers 10 and 12. The required resilience of the seat is provided primarily by these springs and secondly by such resilience as there may be in the fabric. Extensive cushioning is not required and conseqeintly a seat in accordance with the invention is relatively cool even when used in tropical or sub-tropical conditions. If required, ventilation of the air space within the seat cover may be augmented by forming part or all of the seat covers 70 and 76 of an open-weave or other perforate material.

If desired, a limited amount of cushioning may be provided in the immediate vicinity of the tubular frame members but this does not significantly impede the ventilation of the portions of the seat covers in immediate contact with the user's body.

Figure 3:
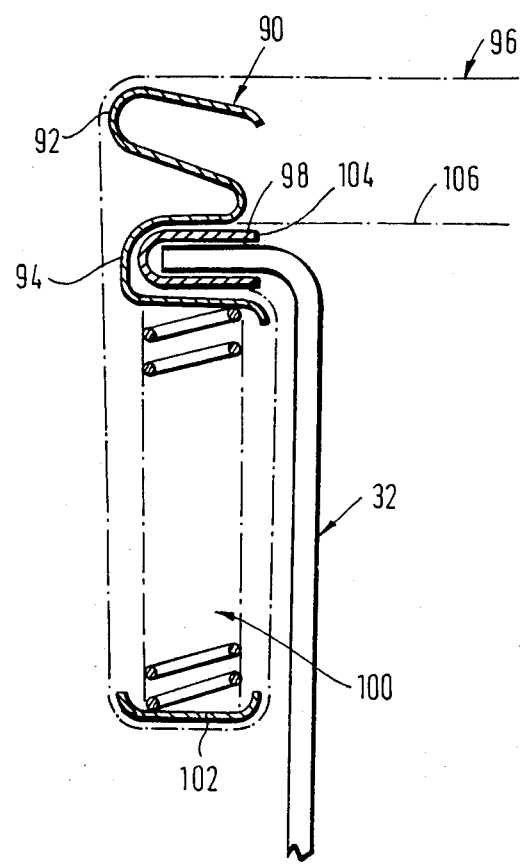
FIG. 3 is a fragmentary sectional view illustrating a modification to the seat shown in FIGS. 1 and 2.

The seat shown in FIG. 3 is supported by means of support legs 32 on seat slides and a height adjustment mechanism (not shown) similar to the corresponding components of the seat shown in FIGS. 1 and 2. However, the first frame member 90 is of a sinuous shape fabricated from rolled sheet material and having two outwardly facing convolutions 92 and 94. The upper convolution 92 provides an edge round which a fabric cover 96 is wrapped, while the lower convolution 94 embraces the outwardly turned upper end 98 of the support leg 32. The end limb of the lower convolution 94 forms an abutment face for a compression spring 100, the other end of which engages with the second frame member 102 which is also formed from sheet material. The end 98 of the leg 32 engages in a U-shaped insert 104. The fabric cover 96 engages between the insert 104 and the inner surface of the convolution 94. Thus the central region 106 of the lower surface of the fabric cover 96 is located above the top of the support leg 32. It is therefore not necessary to provide slots in the cover 96 for the support legs.

We claim:

1. A seat component comprising a rigid frame comprising two mutually parallel side members and two mutually parallel end members interconnecting the ends of the side members, a pair of mutually spaced rigid tensioning members extending parallel to and spaced from the side members on the opposite side of the frame to the body of an occupant of a seat incorporating the seat component, support means rigidly connected to the frame, a fabric cover extending from the tensioning members so as to cover the frame and resilient means connected between the tensioning members and the frame so as to urge the tensioning members away from the frame and thereby to put the fabric cover under tension.

2. A seat component comprising a first rigid frame comprising two mutually parallel side members and two mutually parallel end members interconnecting the ends of the side members, a second rigid frame parallel to and spaced from the first frame on the opposite side thereof to the body of an occupant of a seat incorporating the seat component, support means having outwardly turned upper ends, a fabric sleeve substantially enclosing the first and second frames, U-shaped inserts, wherein the first rigid frame side members comprise a sinuous shape containing upper and lower convolutions forming recesses extending substantially along the length of each of the side members, the upper convolutions having a rounded edges to which the fabric sleeve is wrapped around while the outwardly turned upper ends of the support means are engaged in the U-shaped inserts which, in turn are inserted into the lower convolution of the side member of the first frame, the fabric sleeve enclosing the first and second frames with the part thereof which covers the second frame engaging between each of the U-shaped inserts and the corresponding lower convolutions on the side members of the first frame, and resilient means connected between the first frame and the second frame so as to urge the first and second frames apart from each other and thereby to put the fabric sleeve under tension.

* * * * *